United States Patent [19]
Preutenborbeck et al.

[11] Patent Number: 5,622,040
[45] Date of Patent: Apr. 22, 1997

[54] BEARING FOR AN OPEN-END SPINNING ROTOR

[75] Inventors: Maximilian Preutenborbeck, Aachen; Bert Schlömer, Heinsberg; Michael Pyra, Aachen; Volker Helbig, Erkelenz, all of Germany

[73] Assignee: W. Schlafhorst AG & Co., Moenchengladbach, Germany

[21] Appl. No.: 574,455

[22] Filed: Dec. 15, 1995

[30] Foreign Application Priority Data

Dec. 21, 1994 [DE] Germany ............... 44 45 739.1
Nov. 11, 1995 [DE] Germany ............... 195 42 079.9

[51] Int. Cl.⁶ ............................... D01H 4/00
[52] U.S. Cl. .................... 57/406; 192/105.06 D
[58] Field of Search ............... 57/406, 407, 404; 192/105 CD, 103 D, 104 B; 403/349, 348, 297, 354, 104, 109; 310/90.5

[56] References Cited

U.S. PATENT DOCUMENTS

| | | | |
|---|---|---|---|
| 2,092,060 | 9/1937 | Gairing | 403/348 |
| 3,171,666 | 3/1965 | Benjamin et al. | 403/348 |
| 3,359,020 | 12/1967 | O'Donnell | 403/354 |
| 3,838,560 | 10/1974 | Stahlecker | 57/406 |
| 3,934,950 | 1/1976 | Kuhlmann | 398/10 |
| 4,167,845 | 9/1979 | Munnich et al. | 57/104 |
| 4,551,118 | 11/1985 | Spisz | 403/354 |
| 4,763,469 | 8/1988 | Stahlecker et al. | 57/406 |
| 4,773,210 | 9/1988 | Landwehrkamp et al. | 57/406 |
| 4,943,182 | 7/1990 | Hoblingre | 403/349 |

FOREIGN PATENT DOCUMENTS

| | | | |
|---|---|---|---|
| 7334895 | 9/1973 | Germany . | |
| 2103737B2 | 1/1978 | Germany . | |
| 2634070C3 | 2/1978 | Germany . | |
| 2639763 | 3/1978 | Germany . | |
| 2634070A1 | 8/1981 | Germany . | |
| 4022562A1 | 1/1992 | Germany . | |
| 4022562 | 1/1992 | Germany | 57/406 |

Primary Examiner—William Stryjewski
Attorney, Agent, or Firm—Shefte, Pinckney & Sawyer

[57] ABSTRACT

A magnetic bearing is disclosed for an open-end spinning rotor having a shaft supported in a wedge-like gap formed between at least one pair of support rollers. The bearing comprises a housing for receiving the shaft, a magnet disposed in the housing to extend radially relative to the shaft, and a magnet disposed on and radially extending from the shaft axially adjacent and at a spacing from the magnet in the bearing housing. The magnets have respective poles of the same magnetic orientation disposed to face and thereby repel one another. According to the invention, a coupling connects the shaft and the magnet disposed on the shaft, the coupling being releasable in response to an axial force exerted on the shaft.

18 Claims, 8 Drawing Sheets

BEARING FOR AN OPEN-END SPINNING ROTOR

FIELD OF THE INVENTION

The present invention relates generally to a bearing for the supporting shaft of an open-end spinning rotor wherein the shaft is seated in a wedge-shaped gap formed between at least one pair of support rollers. More particularly, the invention relates to a magnetic bearing system for the rotor shaft, wherein at least one magnet is disposed on the shaft to extend radially therefrom and another magnet supported in a rotor housing is disposed axially adjacent the magnet on the shaft at an axial spacing from the magnet on the shaft, the opposing magnets being of the same orientation to repel one another.

BACKGROUND OF THE INVENTION

It is known in connection with open-end spinning rotors to seat the rotor shaft radially in a wedge-like gap formed by pairs of offset support rollers which makes it possible to securely seat a rotor shaft even at very high rotational speeds (rpm). An axial thrust is exerted on the rotor shaft by means of the offset of the shafts of the paired support rollers, which acts in the axial direction toward the outward end of the shaft opposite the rotor in order to securely seat the rotor, even at high rpm. To be able to absorb such axial forces, it is known to seat the outward end of the shaft on a ball, for example, such as described in German Patent Publication DE 25 14 734 C2. Such a bearing, however, is subject to wear.

It has therefore been proposed to simplify the axial seating of the rotor shaft to overcome such wearing problem. It is known from German Patent Publication DE 26 34 070 C3 to axially fix a rotor shaft by means of a magnetic bearing wherein axially magnetized permanent magnets are disposed at the end of the shaft, while maintaining the shaft diameter, and have disk-shaped pole shoes of the same orientation which are fixed in facing relation to each other.

In such a magnetic bearing arrangement, the rotor shaft is not fixed axially as stably as with the arrangement proposed by German Published, Non-Examined Patent Application DE-OS 26 39 763, wherein the magnets are arranged with essentially radially oriented faces containing magnetic poles of the same orientation placed opposite each other at an axial distance, with at least two such faces arranged parallel such that any axial movement of the shaft causes the axial distance between the magnetic faces to be changed in an opposite direction. With the magnetic bearing proposed in this reference, the rotor shaft can only be removed if the bearing is disassembled or is opened by means of a structurally elaborate mechanism.

SUMMARY OF THE INVENTION

It is accordingly an object of the instant invention to simplify the removal or installation of rotors having magnetic bearings.

This object is attained by providing a novel and improved magnetic bearing for an open-end spinning rotor having a shaft supported in a wedge-like gap formed between at least one pair of support rollers. The bearing comprises a housing for receiving the shaft, a magnet disposed in the housing to extend radially relative to the shaft, and a magnet disposed on and radially extending from the shaft axially adjacent and at a spacing from the magnet in the bearing housing. The magnets have respective poles of the same magnetic orientation disposed to face and thereby repel one another. According to the present invention, a coupling means is providing for connecting the shaft and the magnet disposed on the shaft, the coupling means being releasable in response to an axial force exerted on the shaft.

Thus, in accordance with the present invention, the magnets for axial seating of the rotor are disposed on its outward shaft end at a spacing from the bearing elements for the radial bearing to create a spatial separation between the radial and the axial bearing. As a result, the magnet disposed on the shaft of the rotor remains in the magnetic system during a change of the rotor. The magnet assigned to the rotor is held on the shaft by means of a connection which can be released by an axial force. Hence, a change of a rotor can be performed as easily as, for example, with the known axial shaft bearing by means of a step bearing corresponding to German Patent Publication DE 25 14 734 C2. In the process, the decoupling or coupling of the rotor with the associated magnet takes place by an axial force. The invention makes possible a rotor change without the disassembly or opening of housing elements surrounding the bearings.

Since the magnetic forces for axial fixation of the rotor shaft inside the magnetic bearing are sufficiently large to prevent an axial displacement during the spinning operation, it is also no longer necessary to provide an offset of the shafts of the pairs of support rollers and, thus, the shafts of the support rollers can be arranged parallel, so that the axial thrust forced on the rotor shaft by the step bearing is avoided, which can then be taken into consideration in dimensioning the magnetic bearing because the magnetic bearing will need to absorb lesser axial forces than with a conventional seating of the end of the rotor shaft by means of a ball. As a result, it is possible to apply a harder coating on the support disks which, in turn, permits a considerably higher rotor rpm to be achieved. As a whole, the energy consumption can be noticeably reduced while still providing for simple replacement of the rotors.

According to an advantageous aspect of the invention, a releasable coupling to the rotor shaft is provided in the area of the magnetic bearing system where an appropriate installation space is available to house the coupling elements projecting past the rotor shaft without additional space requirements.

A further aspect of the invention provides for the magnet affixed to the shaft to be disposed on a bushing and the releasable coupling to be located between the shaft and the bushing As will be understood, it is sensible for reasons of efficiency not to incorporate the coupling into the magnetic material. Magnetic materials, particularly those produced by means of powder metallurgy, are difficult to work. Thus, to optimally attain the object of the invention, it is most cost-effective to limit magnetic material to only that area in which a magnetic force is required for bearing purposes. A bushing can be made of an easy-to-work material and a magnet can be easily disposed on this bushing.

The releasable connection between the shaft and the magnet can be a force-actuated connection or an interlocking connection. With a force-actuated connection, a frictional coupling as well as a centrifugal coupling can be utilized, either of which can be released when the rotor shaft is stopped. With a friction coupling, the friction between the rotor shaft and the bushing, on which the magnet associated with the rotor shaft is seated, must be sufficiently large so that the magnet affixed to the rotor shaft rotates integrally therewith when the rotor shaft is introduced into the bushing but also must be releasable by simply pulling the rotor shaft out of the bearing.

An easier releasability of a frictional coupling is achieved if the material of the bushing and the material of the shaft have a different modulus of elasticity, preferably as large a difference as practical. Advantageously, the material of the bushing should have the lower modulus of elasticity by a factor of at least ten, because as a rule the shaft is made of steel or a steel alloy. In view of the modulus of elasticity of steel being about 210,000 N/mm², it is advantageous if the modulus of elasticity of the material of the bushing lies between about 1,500 and 20,000 N/mm².

The selection of steel as the material for the shaft and a plastic material of polyether ether ketone as the material for the bushing has been shown to be advantageous. The plastic material can be reinforced, for example, with fibers such as carbon or glass fibers, and preferably has a modulus of elasticity of about 5,000 to 10,000 N/mm². The elasticity of this material makes coupling and uncoupling possible without noticeable wearing of the coupling, which would limit the intended use.

The magnetic system can be constructed such that the shaft supports two or more ring-shaped magnets, with the magnets being spaced sufficiently from each other to accommodate the magnets disposed in the housing.

As indicated, a centrifugal coupling may also be utilized as the force-actuated connection between the shaft and the magnet, wherein the magnet affixed to the rotor shaft is only caused to rotate after the rotor shaft has exceeded a predetermined rpm. As explained hereinafter, a centrifugal coupling of the bearing in accordance with the invention is of a simple construction.

In another embodiment of the invention, the releasable connection between the shaft and the magnet may comprise an interlocking connection, for example, a bayonet coupling which offers a dependable yet easily releasable connection between the magnet and the rotor shaft.

The connection between the magnet and the rotor shaft by means of a snap-type connection is also conceivable, wherein the coupled parts can be joined, for example, by flexible tongues or balls which snap into provided depressions.

In a further advantageous embodiment of the invention, the magnet assigned to the shaft of the rotor may comprise two ring-shaped partial magnets, wherein the partial magnets are concentrically arranged on the bushing coupled to the rotor shaft with opposite attractive poles of the magnets facing each other. Advantageously, this arrangement causes the magnets to be self-centering on the bushing because of the mutual attraction of the magnets.

This self-centering of the magnets may be assisted by arranging the partial magnets to be partially spaced from each other by a radially oriented rib when viewed in the radial direction. Thus, if a magnet associated with the shaft is abutted against a magnet mounted in the housing, the magnets can be at least partially supported on the rib and are therefore prevented from being separated from the bushing during the insertion of the shaft into the coupling, especially if the two partial magnets are completely spaced from each other, viewed in the radial direction, by means of the rib on the bushing. The support of the magnets on the rib is aided by the self-centering of the magnets. Because of the opposite polarity of their facing sides, the magnets pull each other against the rib.

In a further embodiment of the invention, the two partial magnets are enclosed at their circumference by a ring of non-magnetizable material. As a rule, permanent magnets consist of sintered materials. Because of the porosity of these materials, it is possible that centrifugal forces may have a disadvantageous effect on the cohesion of a sintered body. The ring generates a counter-pressure and prevents the centrifugal force from affecting the magnetic material. The material of the ring consists of a non-magnetizable material so that there is no impairment of the magnetic field of the bearing.

In a further embodiment of the invention, the two ring-shaped partial magnets may be respectively disposed in concentric grooves formed into the radial faces of the bushing. The grooves have the advantage of providing protection against separation of the magnets from the bushing, since the magnets on the bushing will be respectively opposed by the magnets in the housing, as well as providing the advantage of protecting against the effect of centrifugal forces on the magnetic material. This embodiment of the invention has the further advantage that the additional steps of processing another workpiece, required when employing a magnet-enclosing ring, are avoided. In addition, the centering and balancing work required when employing such a ring are also omitted. If the bushing is made as an extruded element, for example from plastic, the grooves can be formed into the bushing in one operating step, which further simplifies the manufacture of the bushing.

An efficient release of the releasable connections is achieved by disposition of the mechanical elements constituting the releasable coupling on the bushing for the magnet assigned to the rotor shaft, so that, upon releasing the connection between the rotor shaft and the magnet, the magnet and its bushing remain in the bearing. The rotor shaft therefore only needs to have depressions or cutouts, for example, which are engaged by the elements making the connection. For example, for a bayonet coupling, it is only necessary to cut a depression into the rotor shaft as well as a slit, by means of which a pin of a shaft holder may be pushed into the depression to be connected therewith in an interlocking manner. With a centrifugal coupling the reversal of the arrangement of the coupling elements is not as practical. With a friction coupling the friction elements can be disposed on the magnet bushing associated with the rotor shaft, so that the rotor shaft only needs to have a cutout for receiving the friction elements.

It is therefore not necessary during a rotor change to also exchange the mechanical coupling elements which remain in the bearing. The manufacture of the rotor shafts is simplified and therefore is cheaper.

The invention will be explained in greater detail hereinafter by means of exemplary embodiments.

BRIEF DESCRIPTION OF THE DRAWINGS

FIG. 1a shows the clamping members at the end of the rotor shaft of FIG. 1 on an enlarged scale;

DETAILED DESCRIPTION OF THE PREFERRED EMBODIMENTS

Figure 1:
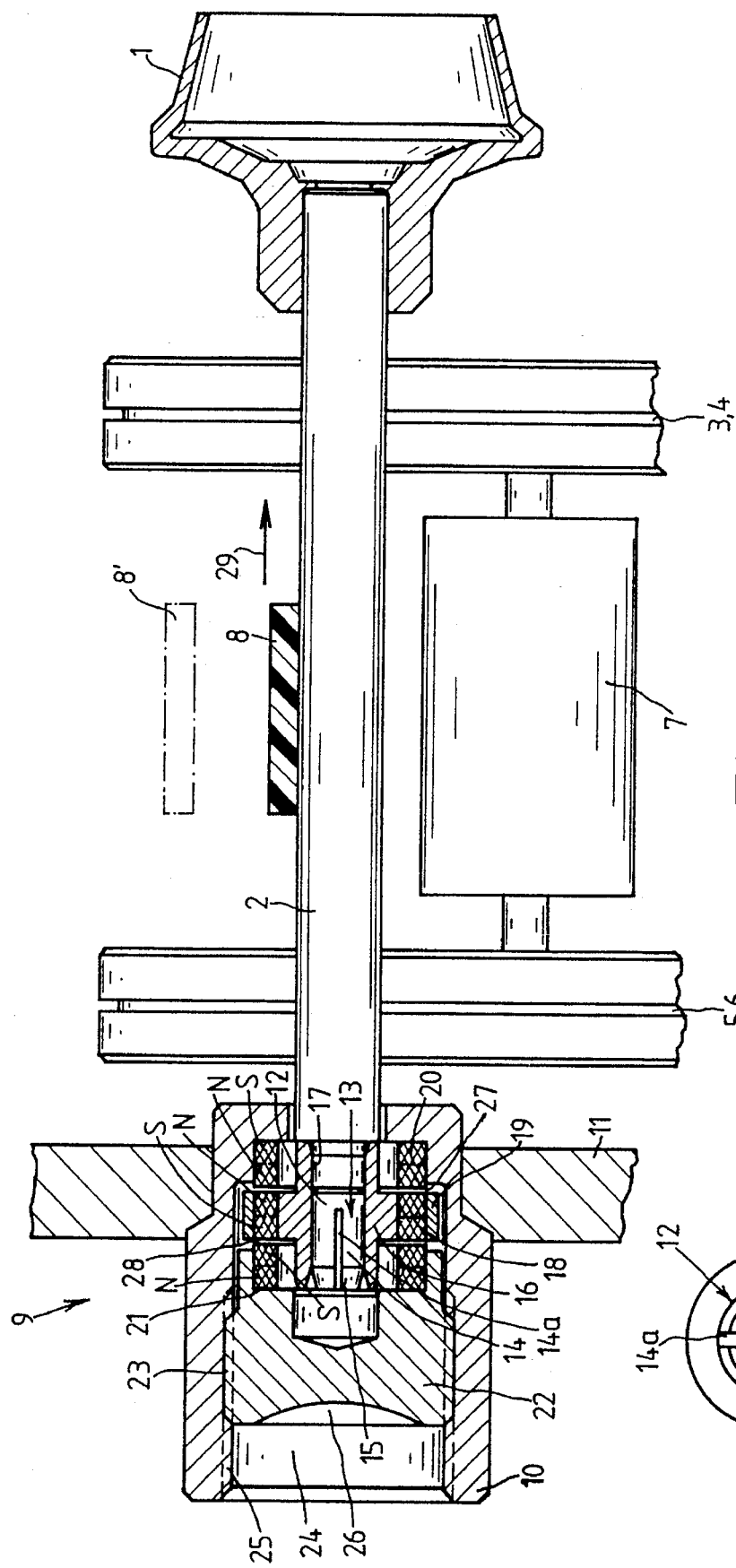
FIG. 1 is a side elevational view, partially in axial cross-section, of a magnetic bearing for a spinning rotor in accordance with one embodiment of the present invention utilizing a clamped force-actuated connection between the rotor shaft and the magnetic bearing in the form of a frictional coupling.

Referring now to the accompanying drawings, several exemplary embodiments are illustrated in accordance with the present invention. With reference initially to FIG. 1, an open-end spinning rotor 1 is shown fastened on a supporting drive shaft 2 which is radially seated by means of two pairs of support rollers 3, 4 and 5, 6 defining wedge-like gaps between the respective rollers of the support roller pairs. The individual support roller of each pair disposed adjacent the viewer has been omitted for the sake of clarity. The respective support rollers 3, 5 and 4, 6 disposed at the same side of the rotor shaft 2 are mounted on respective common shafts supported in a common bearing housing, of which the bearing housing 7 for the support rollers 3, 5 is shown by way of illustration in this exemplary embodiment. This bearing housing 7 is disposed on the spinning unit in a manner not shown in detail in FIG. 1. The rotor is driven in a known manner by means of its shaft 2 via a tangential belt 8 which peripherally contacts the shaft 2 between the two pairs of support rollers to push the shaft 2 into the wedge gap in the operational state, thereby securing the shaft 2 against radial displacement.

Figure 3:
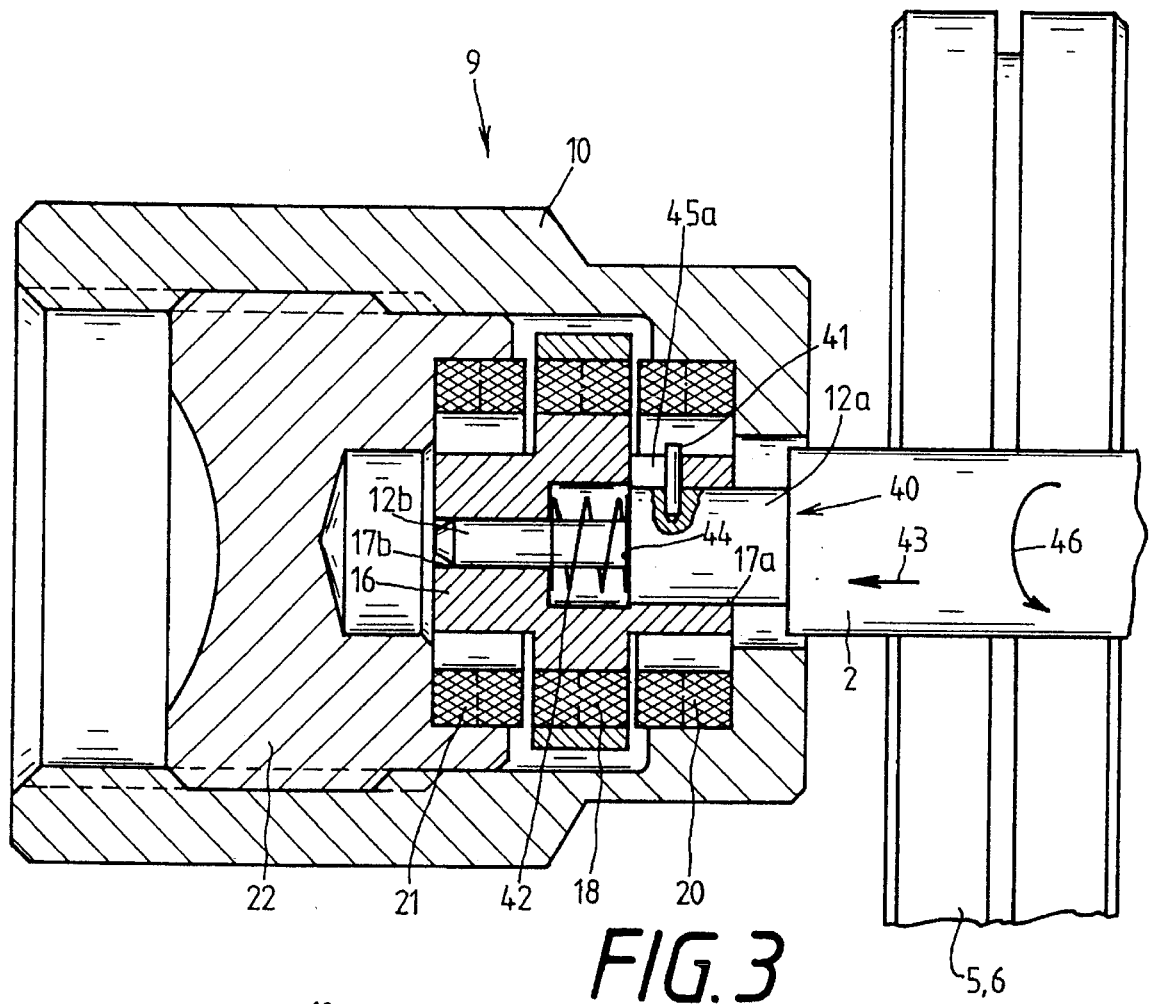
FIG. 3 is another side elevational view, partially in axial cross-section, of a magnetic bearing for a spinning rotor in accordance with a third embodiment of the present invention utilizing a bayonet coupling as an example of an interlocking connection.

The shaft 2 is seated against axial displacement by a magnetic system 9 such as shown, for example, in FIG. 3 of German Published, Non-Examined Patent Application DE-OS 26 39 763. The magnetic system 9 is disposed in a housing 10 which, in turn, is mounted in a wall 11 of a spinning unit, not otherwise shown in detail herein.

The shaft 2 is connected with one magnet of the magnetic system by means of a clamp connector 13, providing a force-actuated form of connection. Specifically, the outward end of the shaft 2 opposite the rotor 1 is stepped into a reduced diameter neck 12, in which four slits 14a are formed in the longitudinal direction dividing the shaft into four segments 14, as can be seen from FIG. 1a. The outer end areas of the segments 14 are conically tapered slightly at 15, to make insertion easier into the magnet arrangement.

A bushing 16 is frictionally fitted onto the stepped end 12 of the shaft 2. The bore 17 of the bushing is of a slightly smaller size relative to the diameter of the stepped end 12, particularly at the segments 14, whereby the bushing 16 is effectively clamped in seated disposition on the shaft 2 when the segments 14 are pushed into the bore 17. The effect of this clamped connection is further increased with higher rpm of the rotor in that the clamping segments 14 are pushed radially outwardly as a result of centrifugal force and therefore contact against the wall of the bore 17 with an increased force.

An annular ring-shaped magnet 18 is mounted centrally along the bushing 16 and is secured by means of a balancing ring 19 which holds the magnet 18 against centrifugal force. The opposing north and south magnetic poles N and S of the magnet 18 face in opposite axial directions. Another ring magnet 20 is fitted into the wall of the housing 10 of the magnetic system 9 in a disposition axially adjacent the radial face of the magnet 18 facing toward the rotor 1 and a third ring magnet 21 is fitted into an insert element 22 to be disposed axially adjacent the opposite radial face of the magnet 18 at the end of the rotor shaft 2. The magnets 20, 21 are also polarized axially, each having opposing north and south magnetic poles N and S which face in opposite axial directions. The respective magnets are thusly arranged with their respective north and south magnetic poles N and S in opposed facing relation to each other whereby the magnets exert repelling forces on each other over the intervening air gaps.

The insert 22 is formed with an outer peripheral thread 23 by which the threaded insert 22 is screwed into the housing 10 in threaded engagement with an interior screw thread 25 formed circumferentially about an inner bore 24 in the housing 10. The threaded insert 22 can be selectively rotated inside the housing 10 by means of a slot 26 in its end face whereby it is possible to adjust the air gaps between the magnets, i.e. a first air gap 27 between the adjacent radial faces of the magnets 18 and 20, and a second air gap 28 between the adjacent radial faces of the magnets 18 and 21. The retaining force exerted by the bearing is also changed by the adjustment of the air gaps 27 and 28. The narrower the air gaps, the greater is the magnetic clamping force on, and the resultant rigidity of, the bearing.

While with the exemplary embodiment in accordance with German Published, Non-Examined Patent Application DE-OS 26 39 763, it is first necessary to perform a disassembly of the bearing in order to be able to exchange a rotor including the magnetic bearing, it is possible in accordance with the device of the present invention to simply pull the rotor, together with its shaft, out of the magnetic bearing system. In the process, the elements of the magnetic bearing system remain in place, i.e., the one (or more) magnet(s) 18 disposed on the shaft 2 of the rotor 1 remains in assembled relation with the other magnets 20,21 inside housing 10 of the magnetic bearing system. After lifting the tangential belt 8 off the rotor shaft 2 into the position 8' (shown in broken lines), the rotor shaft 2 can be pulled out of the wedge gap between the pairs of support rollers 3, 4 and 5, 6 in the axial direction of the arrow 29. In the process the stepped end 12 of the shaft 2 is pulled out of the bore 17 of the bushing 16 by overcoming the clamping force of the clamping segments 14. The bushing 16 with the magnet 18 remains in the magnetic bearing system 9.

Figure 2:
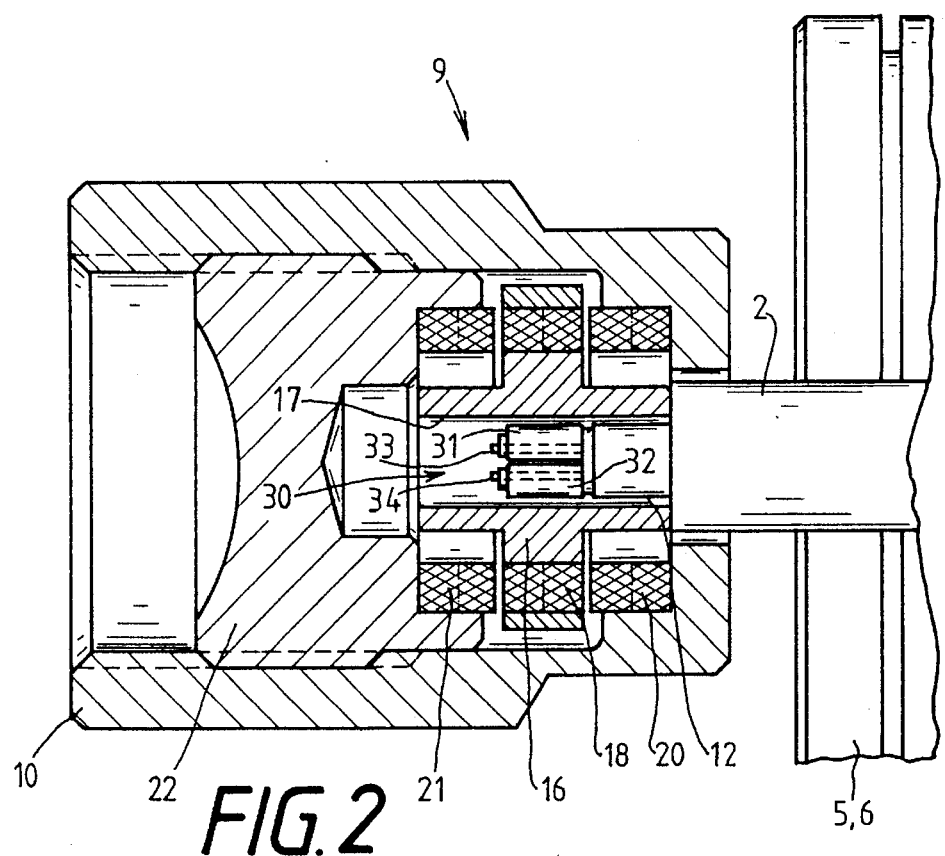
FIG. 2 is another side elevational view, partially in axial cross-section, of a magnetic bearing for a spinning rotor in accordance with a second embodiment of the present invention utilizing a centrifugal coupling as a further example of a force-actuated connection.

A further example of a releasable force-actuated connection between the rotor shaft 2 and a magnetic bearing system is a centrifugal-type coupling, an exemplary embodiment of which is illustrated in FIG. 2. In the centrifugal coupling of FIG. 2, an arrangement of three magnets 18, 20 and 21 and a bushing 16 corresponding to the arrangement in accordance with the embodiment of FIG. 1 is utilized, but in contrast to FIG. 1, the outward end 12 of the shaft 2 which extends into the bore 17 of the bushing 16 is fitted with a centrifugal coupling 30 of a reduced diameter relative to the shaft 2. A front view of the coupling 30 in the unactuated state (i.e. at rest) is shown in FIG. 2a and a front view of the coupling 30 in the centrifugally actuated state is shown in FIG. 2b.

Two centrifugal weights 31 and 32 are disposed at the outward reduced diameter end 12 of the shaft 2, each having essentially a semicircular cross section and being arranged with their secants s1 and s2 facing each other. The centrifugal weight 31 is eccentrically seated to be rotatable on a shaft 33 and the centrifugal weight 32 is likewise eccentrically seated to be oppositely rotatable on a shaft 34. The eccentric weights are urged toward one another into a position of rest by means of springs 35 and 36, which are respectively seated on one end on the shafts 33 or 34 and on with the other end engaged against respective pins 37 and 38. In the position of rest the centrifugal weights do not extend radially outwardly past the circumference of the reduced diameter end 12 of the shaft 2, i.e. the weights are of the same or a lesser overall diameter than the shaft 2.

Thus, when the rotor shaft 2 is driven by means of the tangential belt 8 to reach a defined rpm, the radial force R acting on the centrifugal weights becomes large enough so that they are centrifugally pivoted radially outwardly against the force of the springs 35 and 36 and into frictional engagement against the interior wall of the bore 17 in the bushing 16 to cause the bushing 16 to rotate integrally therewith in the direction of rotation 39. The direction of rotation of the shaft 2 is indicated in FIG. 2b by means of the arrow 39.

Figures 2A, 2B:
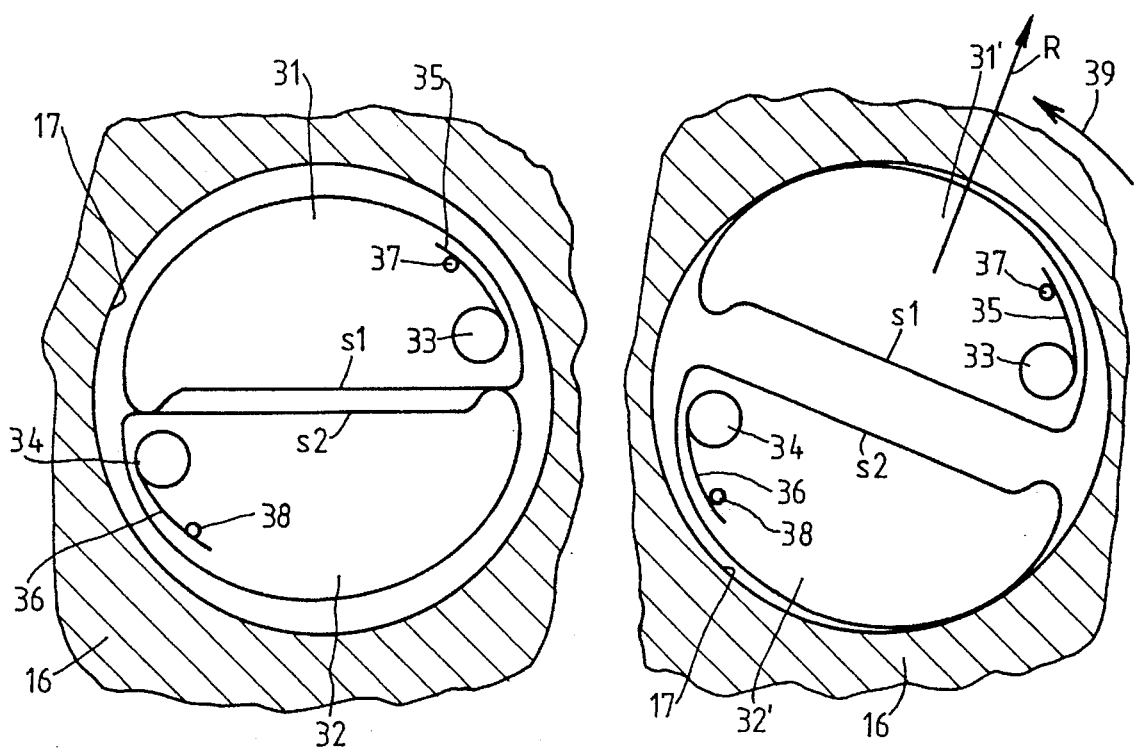
FIG. 2a shows the centrifugal coupling of FIG. 2 in a state of rest.
FIG. 2b shows the centrifugal coupling of FIG. 2 being rotated with the shaft.

In the resting position of FIG. 2a, wherein the springs 35 and 36 have pivoted the centrifugal weights 31 and 32 inwardly, the shaft 2 can be readily pulled out of the bore 17 of the bushing 16, so that the magnetic system remains in the spinning unit.

The suggested direction of rotation 39 and the arrangement of the centrifugal weights as represented in FIGS. 2a and 2b cooperate with the bushing 16 to produce increasing frictional force and clamping effect by means of the centrifugal weights as the rpm of the rotor and the shaft increase.

FIG. 3 shows an exemplary embodiment of an releasable interlocking-type connection of the rotor shaft to a magnetic bearing in the form of a bayonet coupling 40. In this embodiment, the end of the shaft 2 tapers in two stepped 12a and 12b. The bore 17 in the bushing 16 is correspondingly stepped, with a corresponding bore portion 17a being provided for receiving the shaft end portion 12a and a bore portion 17b being provided to receive the narrower end portion 12b of the shaft. The shaft end 12a carries a radially outwardly projecting pin 41. A coil spring 42 is disposed in the bore 17a in surrounding relation to the shaft end portion 12b.

Figure 3A:
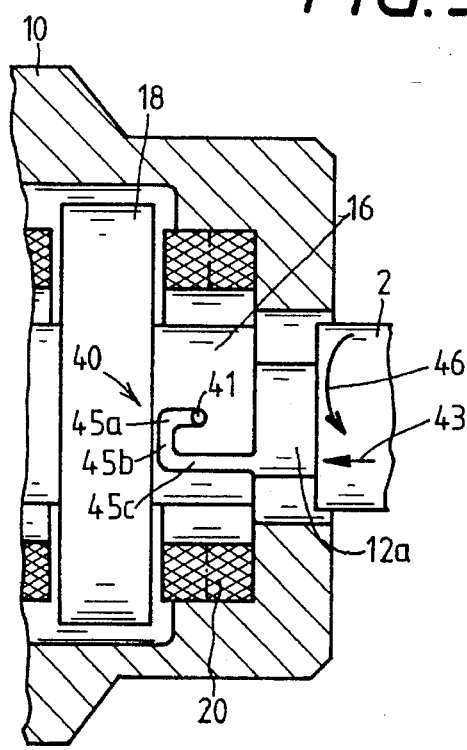
FIG. 3a is a front view of the bayonet-type coupling.

FIG. 3 shows this embodiment with the rotor shaft 2 in a state wherein it is coupled with the magnet 18. A front view of the bayonet coupling 40 is represented in FIG. 3a. If the connection with this magnet is to be released, the shaft 2 must first be pushed in the direction of the arrow 43 causing the front face 44 of the stepped end portion 12a of the shaft 2 to be pressed against the spring 42 to compress it. The pin 41 is thereby displaced within an axial extent 45a of a slit (FIG. 3a) in the bushing 16 for subsequent lateral movement in a circumferential portion 45b of the slit by rotation of the shaft 2 in the circumferential direction 46, until the pin 41 reaches the axial extent 45c of the slit extending parallel with the axis of the shaft 2 in an expulsion position. In such position, the rotor 1 together with its shaft 2 is urged out of the magnetic bearing by the compressed tension of the spring 42 acting against the front face 44 of the stepped end portion 12a of the shaft 2. The insertion of a replacement rotor may take place by inserting the pin 41 of its shaft into the slit 45c and reversing the aforedescribed sequence of steps for releasing the previous rotor.

Figure 4:
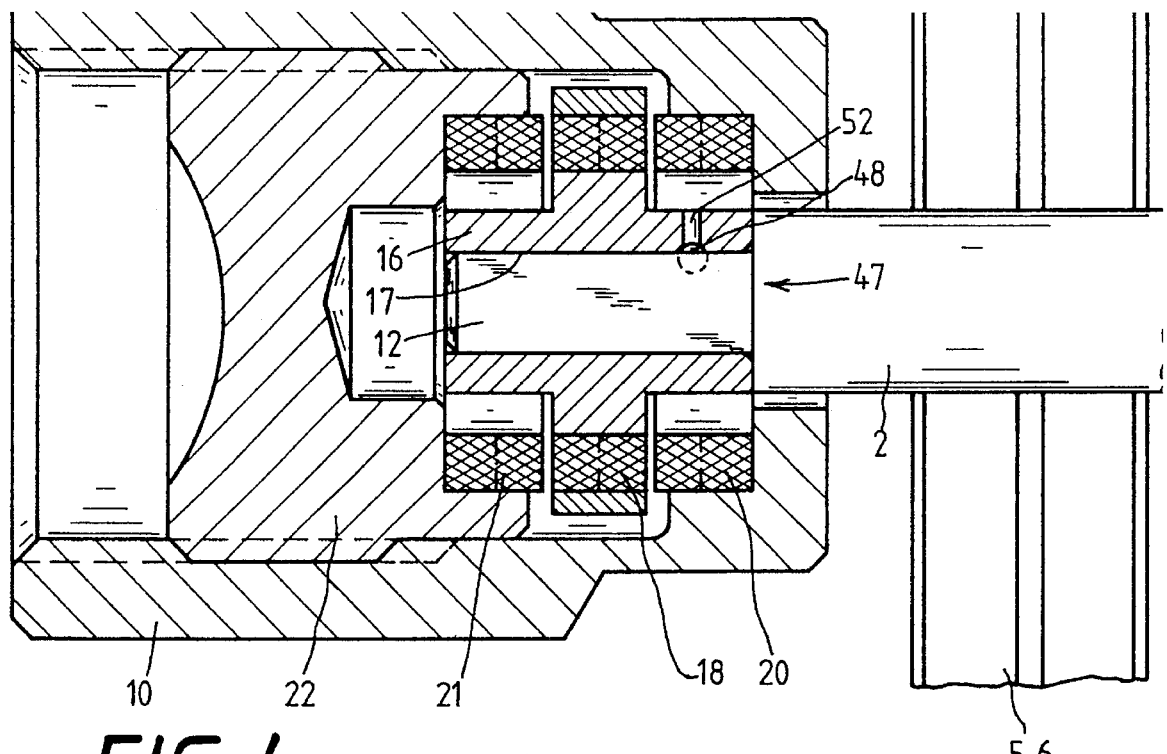
FIG. 4 is another side elevational view, partially in axial cross-section, of a magnetic bearing for a spinning rotor in accordance with a fourth embodiment of the present invention utilizing a square plug connection with a ball type snap-in arrangement.
Figure 4A:
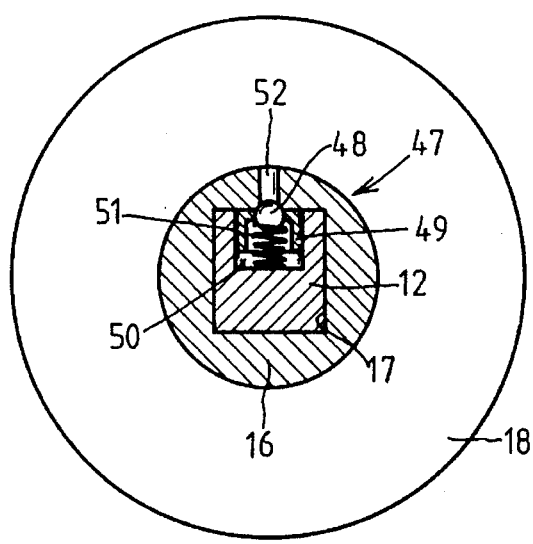
FIG. 4a is a radial cross-sectional view of the ball snap-in connection of FIG. 4 in detail.

Another embodiment of an releasable interlocking connection 47 is represented in FIG. 4 wherein the stepped end 12 of the shaft 2 is embodied to be of a square cross-sectional configuration as shown in FIG. 4a. Other cross-sectional shapes, for example hexagonal, are also possible. In accordance with the square design of the stepped end 12 of the shaft 2, the bore 17 in the bushing 16 is also formed as a square opening for receiving the square shaft end 12. A releasable connection with the bushing 16 is provided by means of a ball retainer assembly wherein a ball 48 is held in a retainer shell 49 threaded into a lateral opening 50 in the stepped end 12 of the shaft 2 to project outwardly from the peripheral contour of the shaft end 12 under the biasing force of a spring 51.

A corresponding bore 52 is formed radially in the bushing 16 to receive the projecting ball 48 by a snap-type connection when the stepped end 12 of the shaft 2 is pushed into the square bore 17. In this manner, axial displacement of the shaft 2 is prevented up to a defined amount of axial force required to overcome the biasing force of the spring 51, thereby providing a releasable connection between the shaft 2 and the magnet/bushing assembly 16, 18. The interlocking connection with the magnet 18 takes place by means of the shape of the stepped end 12.

Figure 5:
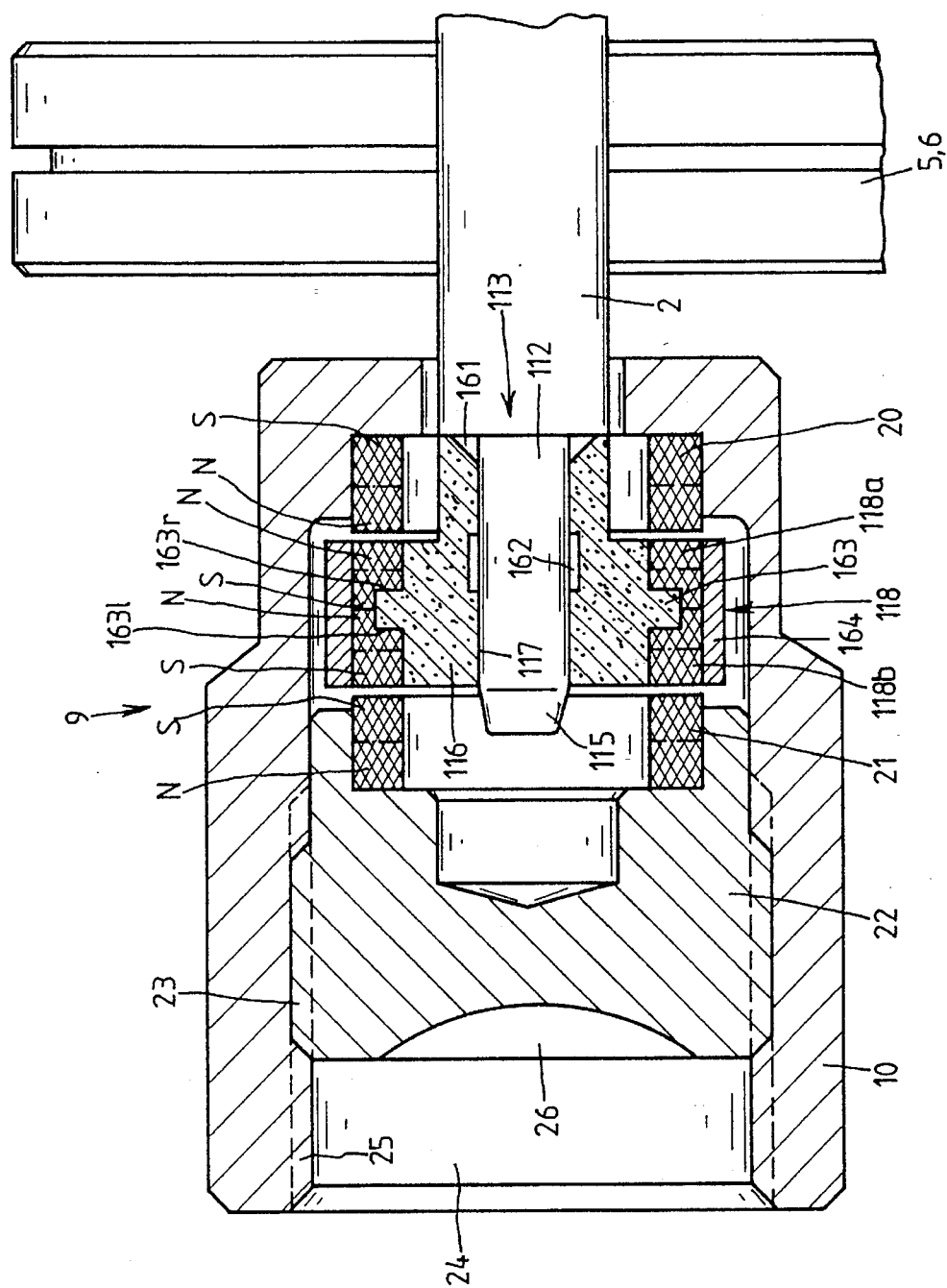
FIG. 5 is another side elevational view, partially in axial cross-section, of a magnetic bearing for a spinning rotor in accordance with a fifth embodiment of the present invention utilizing an exemplary embodiment of a force-actuated connection providing a frictional coupling between the rotor shaft and a bushing consisting of a plastic material and supporting two partial magnets.
Figure 6:
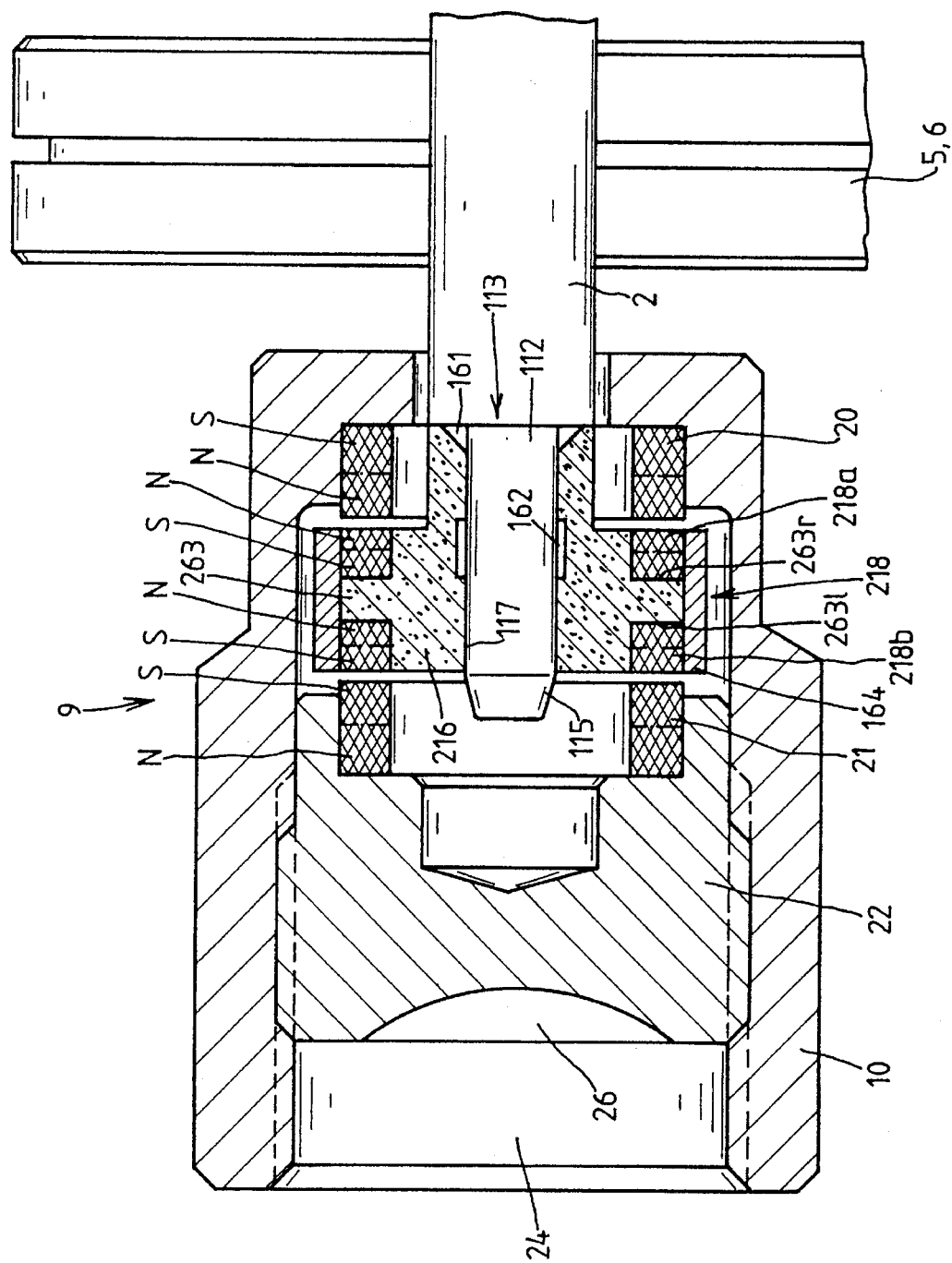
FIG. 6 is another side elevational view, partially in axial cross-section, of a magnetic bearing for a spinning rotor in accordance with a sixth embodiment of the present invention utilizing an alternative embodiment of a force-actuated connection providing a frictional coupling between the rotor shaft and a bushing also consisting of a plastic material and supporting two partial magnets.
Figure 7:
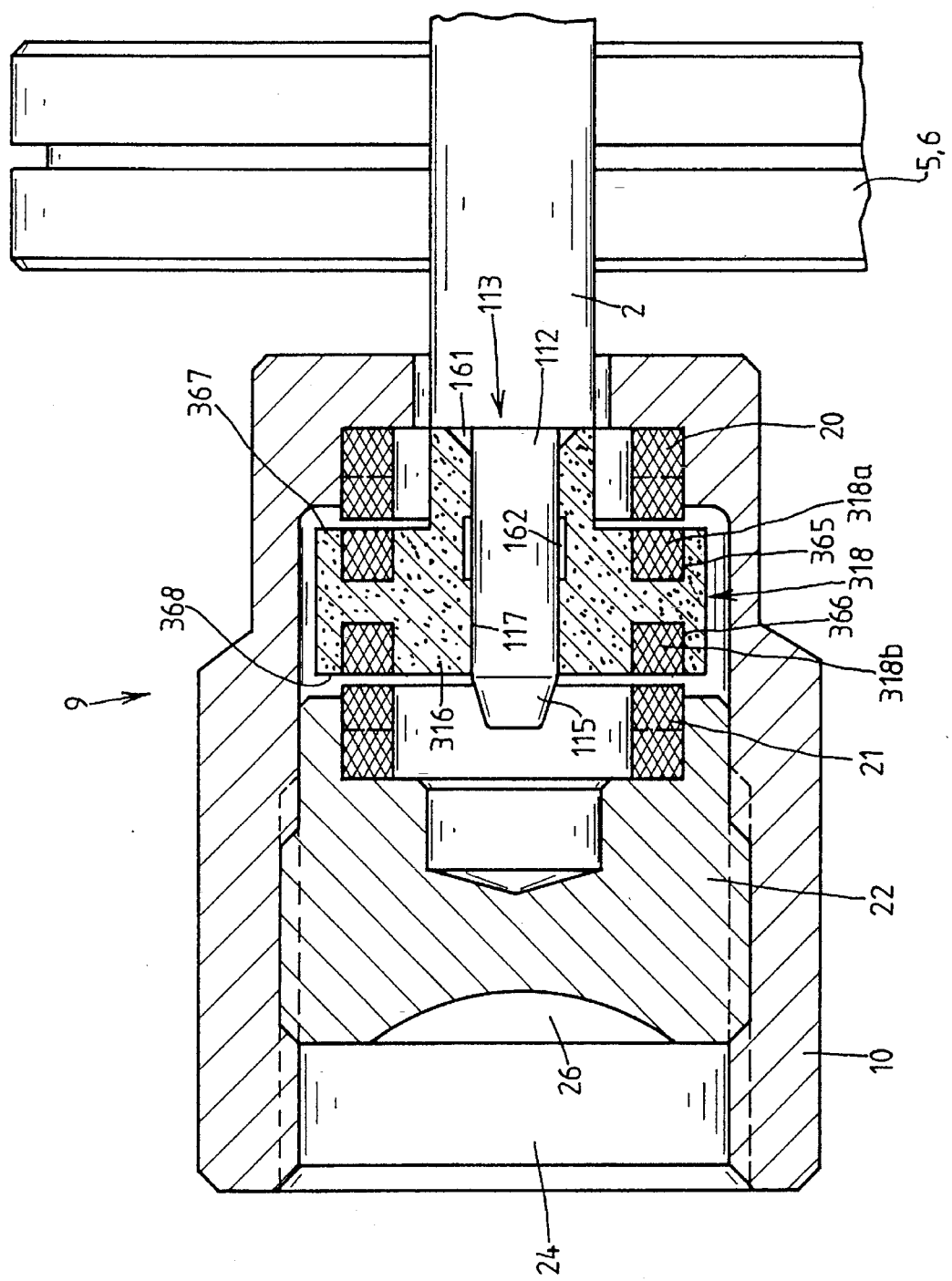
FIG. 7 is another side elevational view of a seventh embodiment of a magnetic bearing comparable to FIG. 6, wherein two magnets are arranged in grooves formed into the opposite radial faces of the bushing.

Three exemplary embodiments of other force-actuated connections between a rotor shaft and a magnetic bearing assembly are represented in FIGS. 5 to 7. In each case, a frictional coupling is provided between the rotor shaft 2 and a bushing of plastic material supporting two partial magnets which are arranged to act like a single magnet. All features agreeing with the previous exemplary embodiments have been indicated by the same reference numerals.

In FIG. 5, the magnets 20 and 21 mounted in the housing 10 of the magnetic bearing system 9 are arranged with their opposite axial poles facing each other. The magnet 118 consists of the two ring-shaped partial magnets 118a,118b mounted by a bushing 116 on the shaft 2 of the rotor 1 in a disposition between the opposed poles of the magnets 20,21. The partial magnets 118a,118b are disposed on the bushing 116, with their opposite poles S and N facing each other. The two partial magnets 118a,118b are enclosed around their circumference by a ring 164 which resists the effects of centrifugal forces on the magnetic material.

The bushing 116 consists of a plastic material with a modulus of elasticity which is lower by a power of ten than the modulus of elasticity of the material of the shaft, typically steel. In the instant embodiment, the plastic material is a polyether ether ketone, to which 30% of glass fibers had been admixed for increased rigidity. The modulus of elasticity of the steel is approximately 210,000 N/mm², while the modulus of elasticity of the plastic material is between 5,000 and 10,000 N/mm². This pairing of materials is ideal for accomplishing the intended releasable frictional coupling. Specifically, in the course of pushing the stepped end portion 112 of the shaft 2 into or pulling it out of the bore 117 of the bushing 116, sufficient friction is created between the bushing 116 and the end portion 112 of the shaft 2 to resist relative movement thereof, thereby causing the material of the bushing to deform until a sufficient force is exerted to overcome such friction. To ease the removal and insertion of the stepped end portion 112 of the shaft 2, the outer end of the stepped end portion 112 is cone-shaped at 115 and the bore 117 of the bushing 116 is conically enlarged at its outward end 161 facing the rotor. The bore 117 also is formed with an annular relief recess 162 centrally along its length, which further eases the insertion of the stepped end 112.

The two magnets 118a,118b are glued to the bushing 116 in adjacent abutment supporting one another at opposite sides of an annular rib 163 protruding radially from the bushing 116 between the two partial magnets 118a,118b. Because their opposite poles face each other, a mutual attraction of the partial magnets is produced to aid their contact with the rib 163 and thus their fixation on the bushing. The rib 163 effectively prevents the separation of the magnets 118a,118b from the bushing 116 in the course of pulling out or inserting the rotor shaft into the magnet. If the pulling or pushing forces exceed the opposing magnetic forces between the magnet 118 assigned to the shaft and the magnets 20 and 21 disposed in the housing, the magnet 118 comes into abutment either against the magnet 20 or the magnet 21. Under a tensional (pulling) stress, movement of the partial magnet 118a will be resisted by the front face 163r of the rib 163, while under a pushing stress, movement of the partial magnet 118b will be resisted by the front face 163l of the rib 163.

The embodiment of FIG. 6 differs from the embodiment of FIG. 5 exclusively in the configuration of the partial magnets and the bushing. For this reason, features which agree with the features of FIG. 5 have been provided with the same reference numerals.

The bushing 216 has a more radially enlarged rib 263 and the two partial magnets 218a, 218b of the magnet 218 are in the form of flat annular disks, by means of which the two partial magnets 218a,218b as supported on the shaft 2 of the rotor 1 are completely spaced from each other by the intervening rib 263. The shape of the partial magnets 218a, 218b is therefore simpler than their shape in the previous embodiment of FIG. 5. In this embodiment, the partial magnets 218a,218b are completely supported on the opposite radial faces 263r, 263l of the rib 263. Separation of the partial magnets from the bushing 216 is thereby prevented when they come into abutment against the magnets 20, 21 disposed in the housing 10 in the course of pulling the rotor shaft out of, or inserting it into, the bushing 216. As in the previous embodiment of FIG. 5, the two partial magnets 218a,218b are also enclosed by a ring 164.

The embodiment of FIG. 7 differs from the previous exemplary embodiments in that the partial magnets 318a, 318b of the magnet 318 assigned to the shaft 2 of the rotor are fitted and glued into annular grooves 365,366 formed concentrically into the opposite radial faces 367,368 of the bushing 316. The grooves 365,366 can be formed into the bushing 316 in the course of molding or otherwise fabricating the bushing 316 from a plastic material or the grooves can be cut subsequently into the radial faces 367,368.

Figure 8:
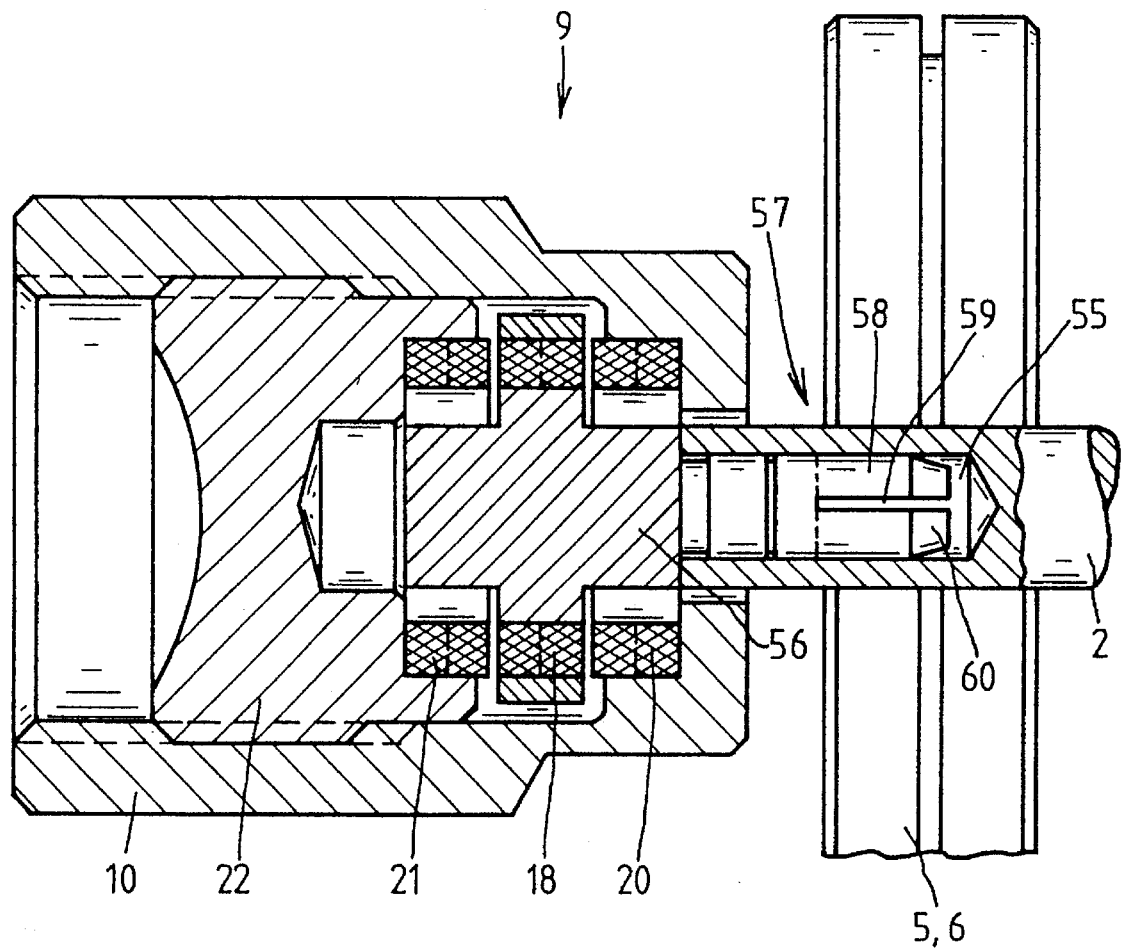
FIG. 8 is another side elevational view of an eighth embodiment of a magnetic bearing, showing a reversal of the arrangement of the coupling elements.

FIG. 8 shows an embodiment wherein the mechanical elements providing the releasable connection are formed as part of the supporting element for the magnet assigned to the rotor shaft rather than as part of the rotor shaft. Thus, the embodiment of FIG. 8 essentially represents a reversal of the fastening element in the embodiment in FIG. 1. As will thus be understood, with the exception of utilizing a centrifugal coupling, the fastening elements in any of the embodiments can be interchangeably disposed either on the shaft or on the element supporting the shaft magnet.

In accordance with FIG. 8, the shaft 2 does not have a stepped or reduced diameter end 12 engaged in a bore of the bushing 16, but instead, the shaft 2 has a bore 55 formed into its outer end. The magnet 18 is not disposed on a shaft bushing, but on a cylindrical body 56 from which extends a short length of shaft having clamping segments 58 constituting mechanical elements providing a releasable connection 57.

The bore 55 is smaller than the clamping segments 58, so that a frictional clamping connection is made by means of the clamping segments 58 when the rotor shaft 2 is pushed onto the segments 58. Hence, this embodiment of a clamping connection 57 is comparable with the embodiment shown in FIG. 1a. The clamping segments 58 are separated from each other by means of axial slits 59, with the outer ends of the segments 58 being tapered at 60 to make easier their insertion into the bore 55 in the shaft 2.

Advantageously, such embodiments wherein the elements for making the connection are disposed on the magnet assigned to the rotor shaft or on a supporting body therefor simplify the manufacture of the rotor shaft because it merely needs to be formed with a receiving means, for example a bore with an appropriate contour, or a slit guidance. Such embodiments are simpler and less expensive to produce, because the connection elements remain with the magnet and need only be produced once for each spinning station rather than on every shaft. Thus, only the receiving opening, which is simple to produce, needs to be provided in the shafts of the rotors to be exchanged.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A magnetic bearing for an open-end spinning rotor having a shaft supported in a wedge-like gap formed between at least one pair of support rollers, the bearing comprising a housing for receiving the shaft, a pair of first magnets spaced from each other and disposed in the housing to extend radially relative to the shaft, a second magnet disposed on and radially extending from the shaft axially intermediate and at a spacing from the first magnets in the bearing housing, the first and second magnets having respective poles of the same magnetic orientation disposed to face and thereby repel one another, and a coupling means for connecting the shaft and the magnet disposed on the shaft, the coupling means being selectively releasable in response to an axial force exerted on the shaft.

2. A bearing in accordance with claim 1, wherein the releasable coupling means is located in the area of the bearing housing between the shaft and the second magnet.

3. A bearing in accordance with claim 1, wherein the second magnet is mounted on a bushing on the shaft and the releasable coupling means is located between the shaft and the bushing.

4. A bearing in accordance with claim 3, wherein the releasable coupling means comprises a frictional coupling, the shaft of the rotor and the bushing being formed of respective materials having different moduli of elasticity, the modulus of elasticity of the material of the shaft being greater by a power of ten than the modulus of elasticity of the material of the bushing.

5. A bearing in accordance with claim 4, wherein the shaft comprises steel and the bushing comprises a material with a modulus of elasticity between 1500 and 20000 N/mm$^2$.

6. A bearing in accordance with claim 5, wherein the bushing comprises a plastic material made of polyether ether ketone.

7. A bearing in accordance with claim 3, wherein the second magnet comprises at least two annular partial magnets disposed on the bushing with their opposite poles in facing relation to one another.

8. A bearing in accordance with claim 7, wherein the bushing has a radially projecting rib, and the partial magnets are disposed on the bushing at a partial spacing from one another defined by the rib.

9. A bearing in accordance with claim 7, wherein the bushing has a radially oriented rib, and the partial magnets are disposed on the bushing at a complete spacing from one another defined by the rib.

10. A bearing in accordance with claim 7, wherein the partial magnets are circumferentially enclosed by a ring.

11. A bearing in accordance with claim 7, wherein the partial magnets are disposed in annular grooves on radial faces of the bushing.

12. A bearing in accordance with claim 1, wherein the releasable coupling means forms a force-actuated connection between the shaft and the second magnet.

13. A bearing in accordance with claim 12, wherein the releasable coupling means comprises a frictional coupling.

14. A bearing in accordance with claim 12, wherein the releasable coupling means comprises a centrifugal coupling.

15. A bearing in accordance with claim 1, wherein the releasable coupling means forms an interlocking connection between the shaft and the second magnet.

16. A bearing in accordance with claim 15, wherein the releasable coupling means comprises a bayonet coupling.

17. A bearing in accordance with claim 15, wherein the releasable coupling means comprises a snap-type coupling.

18. A bearing in accordance with claim 1, wherein the releasable coupling means comprises at least one coupling element connected to the second magnet which remains in the bearing housing when the rotor shaft is released from the magnet thereon.

* * * * *